(12) United States Patent
Yamada et al.

(10) Patent No.: US 7,954,045 B2
(45) Date of Patent: May 31, 2011

(54) RECOMMENDATORY INFORMATION PROVISION SYSTEM

(75) Inventors: Toshiya Yamada, Kanagawa (JP); Takeshi Yoshioka, Kanagawa (JP); Hirohito Shibata, Kanagawa (JP); Hitoshi Ikeda, Kanagawa (JP); Motofumi Fukui, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1111 days.

(21) Appl. No.: 11/332,225

(22) Filed: Jan. 17, 2006

(65) Prior Publication Data
US 2006/0277455 A1 Dec. 7, 2006

(30) Foreign Application Priority Data

Jun. 7, 2005 (JP) ................ P.2005-167216

(51) Int. Cl.
*G06F 17/00* (2006.01)
*G06F 15/00* (2006.01)
(52) U.S. Cl. ............ 715/206; 715/200; 707/E17.109
(58) Field of Classification Search .......... 715/205, 715/206, 200; 707/E17.109
See application file for complete search history.

(56) References Cited

U.S. PATENT DOCUMENTS

| | | | | |
|---|---|---|---|---|
| 6,012,083 | A * | 1/2000 | Savitzky et al. | 709/202 |
| 6,438,579 | B1 * | 8/2002 | Hosken | 709/203 |
| 6,489,968 | B1 * | 12/2002 | Ortega et al. | 715/713 |
| 6,567,797 | B1 * | 5/2003 | Schuetze et al. | 707/2 |
| 6,606,581 | B1 * | 8/2003 | Nickerson et al. | 702/186 |
| 7,054,900 | B1 * | 5/2006 | Goldston | 709/203 |
| 2001/0028603 | A1 * | 10/2001 | Shimazu | 368/10 |
| 2002/0065802 | A1 * | 5/2002 | Uchiyama | 707/1 |
| 2002/0186867 | A1 * | 12/2002 | Gutta et al. | 382/116 |
| 2003/0004937 | A1 * | 1/2003 | Salmenkaita et al. | 707/3 |
| 2003/0195884 | A1 * | 10/2003 | Boyd et al. | 707/7 |
| 2004/0002920 | A1 * | 1/2004 | Prohel et al. | 705/51 |
| 2004/0019846 | A1 * | 1/2004 | Castellani et al. | 715/500 |
| 2004/0172267 | A1 * | 9/2004 | Patel et al. | 705/1 |
| 2004/0254911 | A1 * | 12/2004 | Grasso et al. | 707/1 |

(Continued)

FOREIGN PATENT DOCUMENTS

JP A 10-269237 10/1998

OTHER PUBLICATIONS

D. Billsus et al., "Improving Proactive Information Systems," ACM IUI 2005, pp. 159-166.

(Continued)

*Primary Examiner* — Stephen S Hong
*Assistant Examiner* — Marshon Robinson
(74) *Attorney, Agent, or Firm* — Oliff & Berridge, PLC

(57) ABSTRACT

A recommendatory information provision system has a management apparatus and a user terminal device. The management apparatus includes a browsed information acquisition unit for acquiring information of a browsed document, a recommended document retrieval unit for retrieving a recommended document relevant to the browsed document, a recommendation history management unit for storing and managing history information which concerns recommendations of the recommended document, a recommendation history retrieval unit for retrieving from the recommendation history management unit, the history information of the recommended document which has been retrieved by the recommended document retrieval unit, and a recommendatory information provision unit for providing, to the user terminal device, the information concerning the recommended document and the history information of the recommended document as have been retrieved. The user terminal device has a display process unit for displaying the information on a screen.

30 Claims, 6 Drawing Sheets

U.S. PATENT DOCUMENTS

| | | | | |
|---|---|---|---|---|
| 2006/0263041 A1* | 11/2006 | Gustta | | 386/83 |
| 2006/0271548 A1* | 11/2006 | Maes | | 707/10 |
| 2007/0134641 A1* | 6/2007 | Lieu | | 434/350 |
| 2009/0292672 A1* | 11/2009 | Kunjithapatham et al. | | 707/3 |
| 2009/0317052 A1* | 12/2009 | Sezan et al. | | 386/52 |

OTHER PUBLICATIONS

B. J. Rhodes et al., "Margin Notes: Building a Contextually Aware Associative Memory," ACM IUI 2000, pp. 219-224.

* cited by examiner

FIG. 2

RECOMMENDATION HISTORY TABLE

| USER ID (USER NAME) | DATE AND TIME | KEY DOCUMENT (DOCUMENT TITLE) | RECOMMENDATION LIST ID |
|---|---|---|---|
| U002 (YAMADA) | 2005-01-19-10-25 | Document-069 (AAAAA) | R001 |
| U001 (・・・・・) | 2005-01-20-12-34 | Document-023 (・・・・・) | R002 |
| U004 (・・・・・) | 2005-01-20-15-31 | Document-012 (・・・・・) | R003 |
| U003 (・・・・・) | 2005-01-21-14-54 | Document-087 (・・・・・) | R004 |

RECOMMENDATION INFORMATION LIST TABLE

| RECOMMENDATION LIST ID | RECOMMENDED DOCUMENT ID (DOCUMENT TITLE) | ACCESS FLAG |
|---|---|---|
| R001 | Document-109 (DDDDD) | 0 |
| R001 | Document-134 (・・・・・) | 1 |
| R001 | Document-167 (・・・・・) | 0 |
| R002 | Document-134 (・・・・・) | 0 |
| R002 | Document-209 (・・・・・) | 0 |
| R002 | Document-224 (・・・・・) | 0 |
| R003 | Document-312 (・・・・・) | 1 |
| R003 | Document-134 (・・・・・) | 0 |
| R004 | Document-452 (・・・・・) | 1 |
| R004 | Document-134 (・・・・・) | 0 |
| R004 | Document-47 (・・・・・) | 0 |

| DOCUMENT TITLE | NUMBER OF TIMES OF RECOMMENDATIONS | NUMBER OF TIMES OF ACCESSES | DEGREE OF UTILIZATION (NUMBER OF TIMES) | NUMBER OF PERSONS OF RECOMMENDATIONS | NUMBER OF PERSONS OF ACCESSES | DEGREE OF UTILIZATION (NUMBER OF PERSONS) |
|---|---|---|---|---|---|---|
| AAAAA | 30 | 5 | 0.17 | 12 | 3 | 0.25 |
| BBBBB | 25 | 7 | 0.28 | 9 | 5 | 0.56 |
| CCCCC | 52 | 13 | 0.25 | 15 | 12 | 0.8 |
| DDDDD | 22 | 10 | 0.45 | 7 | 7 | 1.0 |

RECOMMENDATORY INFORMATION PROVISION SYSTEM

BACKGROUND OF THE INVENTION

1. Field of the Invention

The present invention relates to a technique which performs a process for recommending a user terminal device other documents relevant to a browsed document that is browsed by the user terminal device. More particularly, it relates to a technique which provides in addition to recommended document information, the recommendation histories of the recommended documents.

2. Background Art

Using a user terminal device such as desktop computer or mobile computer, it is performed to browse a document stored in the memory of the user terminal device or a document acquired through a network, by displaying the document on a screen.

In such a document browsing process, it is performed that a user acquires the document to-be-browsed by retrieving the document from the memory, a data server, a Web site or the like.

A typical information retrieval method in the related art is such that, in response to the input of a retrieval keyword as is explicitly performed by the user, documents in which the keyword is contained or document information items which are endowed with the keyword as an index are outputted as retrieved results.

With such an information retrieval method, however, the user must give a retrieval instruction by creating a retrieval expression which uses the retrieval keyword explicitly, and he/she must seek the necessary document from among the obtained retrieval results.

On the other hand, notice is taken of an information recommendation technique in which relevant document information items are retrieved automatically on the basis of specified document information and without the creation of any retrieval expression by a user, so as to present the retrieved information items to the user.

In recent years, the information recommendation technique has been noticed for its utilization in Internet shopping (the recommendations of relevant commodities based on a purchase history) or a news broadcast service (the provision of past news relevant to a news article). Besides, the information recommendation technique is being noticed for the active use of a corporate memory or an expansion to a knowledge management, owing to cooperation with a document archive system.

There has been known, for example, a system wherein a feature word is extracted from the content text of a Web page being browsed by a Web browser, documents of relevant contents are automatically retrieved from a specified database by using the feature word, and the retrieved documents are provided to a user terminal device (refer to JP-A-10-269237, FXPAL Bar, Improving Proactive Information Systems, ACM IUI 2005, and Margin Notes, Margin Notes: Building a Contextually Aware Associative Memory, ACM IUI 2000).

Incidentally, the documents being retrieved results have their titles or summaries, their retrieval keyword, etc. displayed in juxtaposition with the Web page being browsed, or they are presented in a separate window or as a list which can be traced from the menu of an application.

With the related-art information recommendation system as stated above, the documents recommended by the system are determined on the basis of their degrees of similarities to the contents of the Web page being browsed by the user. The system, however, has had the problem that the extents to which the recommended documents are actually valuable for the user are unknown.

SUMMARY OF THE INVENTION

The present invention has been made in view of the circumstances of the related art, and has for its object to make a user easy of judging the values of recommended documents which are provided on the basis of a browsed document.

The present invention is based on, for example, an idea as stated below. Such recommendation history information on if any document recommended by a system was recommended to a browsing user or another user (in the invention, the "user" shall also cover a group or organization to which users belong) in the past, or on if the recommended document was accessed by the other user, is presented to the browsing user, whereby information can be afforded for judging the extent to which the recommended document is useful for the browsing user or the other user. Besides, start information at the time of the recommendation and the information of any other document concurrently recommended at that time are presented to the browsing user, whereby the browsing user is permitted to know a context in the case of the document recommendation and to judge a more accurate degree of utility.

By way of example, according to the invention, when a user is browsing a Web page by the Web browser of a user terminal device, other documents relevant to the contents of the Web page are automatically retrieved from a specified database, and the information items of the other retrieved documents (such as the identification information items, URLs or actual data of the documents) are provided to the user terminal device and presented to the user as recommended documents. In addition to the recommended document information, information on if the recommended documents were recommended to the browsing user himself/herself or other users in the past, information on if the recommended documents were accessed by the users for the recommendations, Web pages which were retrieval keys at the times of the recommendations, the information items of documents concurrently recommended at those times, and the like recommendation history information items of the recommended documents are provided to the user terminal device and presented to the user.

Concretely, the invention is realized in various aspects such as a recommendatory information provision system, a management apparatus which constitutes the recommendatory information provision system, a user terminal device which constitutes the recommendatory information provision system, a program through which the management apparatus is configured of a computer, and a method which is performed by the recommendatory information provision system.

The recommendatory information provision system according to the invention consists in a recommendatory information provision system wherein a management apparatus provides to a user terminal device, information (a title, a URL, actual data or the like) that concerns any recommended document relevant to a document being browsed by the user terminal device, in which the management apparatus includes a browsed information acquisition unit, a recommended document retrieval unit, a recommendation history management unit, a recommendation history retrieval unit, and a recommendatory information provision unit, and the user terminal device includes a display process unit for displaying on a screen, the information concerning the recommended document and the history information of this recommended document as have been provided from the management apparatus.

Besides, the browsed information acquisition unit acquires the information of the browsed document which is being browsed by the screen display of the user terminal device, the recommended document retrieval unit retrieves the recommended document relevant to the browsed document, on the basis of acquired document information the recommendation history retrieval unit retrieves the history information of the retrieved recommendatory document with reference to the recommendation history management unit for storing and managing the history information concerning the recommendation of the recommended document, and the recommendatory information provision unit provides the information concerning the retrieved recommendatory document and the history information of this recommended document to the user terminal device.

Thus, a browsing user can display and confirm the information concerning the recommended document and the history information of this recommended document on the screen of the user terminal device, and he/she can judge the utility of the recommended document from the history information of this recommended document on that occasion.

Here, the retrieval of the recommended document relevant to the browsed document can be done by any of various known methods. Typically, a feature word is extracted from the contents of the browsed document, whereupon the retrieval is performed by a document retrieval process which uses the feature word as a keyword, or by a retrieval process for any document which contains a feature word similar to the extracted feature word. Alternatively, a table in which pluralities of relevant documents are associated by identification information items may well be prepared beforehand so as to retrieve the relevant recommended documents on the basis of the identification information of the browsed document.

Besides, that information of the browsed document which is to be acquired differs depending upon the retrieval process method for the recommended documents. By way of example, in the retrieval process method which extracts the feature word from the browsed document, the actual data of the browsed document may be acquired as the information thereof, and in the retrieval process method which employs the association table, the identification information of the browsed document may be acquired as the information thereof.

Besides, the information items concerning the recommended documents as are provided to the user terminal device are, for example, the list of the titles, the URLs or the likes of the recommended documents, but they may well be the actual data of the recommended documents. Essentially, they may be recommended-document information items on the basis of which the browsing user accesses and browses the recommended documents.

Further, the history information items concerning the recommendations of the recommended documents may be information items which can contribute to the judgments of the utilities of the recommended documents, and which are as stated below by way of example.

As the history information of each recommended document, the identification information of any user to whom the recommended document was recommended in the past (the name, the ID or the like of the browsing user or any other user) may well be provided to the user terminal device.

Thus, the browsing user can be given such information indicating if the document currently recommended was recommended to the browsing user himself/herself in the past, or the user to whom the document was recommended in the past. The information can serve to judge the utility of the recommended document.

Besides, information on the time of the past recommendation may well be included in the history information of the recommended document. Thus, the time information can serve to judge the utility of the recommended document in such a manner, for example, that the document recommended at a comparatively old time has a low utility.

Besides, as the history information of the recommended document, the history of the existence or nonexistence of access to the recommended document by the browsing user or any other user may well be provided to the user terminal device.

Thus, the browsing user can be given such information indicating whether the document currently recommended was merely recommended to the user in the past, or it was actually accessed and browsed and utilized by the user who received the recommendation. The information can serve to judge the utility of the recommended document.

Besides, information on the time of the past access may well be included in the history information of the recommended document. Thus, the time information can serve to judge the utility of the recommended document in such a manner, for example, that the document accessed comparatively recently has a high utility because it is a document of timely contents in which the browsing user is interested.

Besides, as the history information of the recommended document, information (a title, actual data or the like) concerning a past browsed document from which the retrieval of the recommended document originated may well be provided to the user terminal device.

Thus, the browsing user can be given such information indicating the browsed document on the basis of which the document currently recommended was recommended in the past. The information can serve to judge the utility of the recommended document from the relation between the document currently browsed and the browsed document on the basis of which the recommended document was recommended in the past.

Besides, information concerning any other recommended document which was recommended in the past on the basis of the past browsed document of the recommendation origin may well be included in the history information of the recommended document. Thus, such relevance as the current recommended document—the browsed document which was the past recommendation origin—the other recommended document which was recommended in the past on the basis of the browsed document of the recommendation origin, can be presented to the browsing user, and the information can serve to judge the utility of the current recommended document.

Here, in the invention, the history information items of the recommended documents should preferably be represented by signs different in accordance with their contents and then provided to the user terminal device. By way of example, the difference between the browsing user and any other user, and the difference between the case where the document was merely recommended and the case where it was actually accessed, are represented by the signs differing in sort, shape, color or the like and are displayed on the screen of the user terminal device. Thus, the browsing user can grasp the contents of the recommended-document history information items at a look.

According to the present invention, information concerning any retrieved recommendatory document and the history information of the recommended document are provided to a user terminal device. Therefore, a browsing user can display and confirm the information concerning the recommended document and the history information of this recommended document on the screen of the user terminal device, and he/she can easily judge the utility of the recommended document owing to the history information of this recommended document.

BRIEF DESCRIPTION OF THE DRAWINGS

These and other objects and advantages of this invention will become more fully apparent from the following detailed description taken with the accompanying drawings in which:

FIG. 2 is a diagram for explaining recommendation history information according to an embodiment of the invention;

FIG. 8 is a diagram for explaining a screen display example of the recommendation history information according to an embodiment of the invention; and FIG. 9 is a diagram for explaining a screen display example of the recommendation history information according to an embodiment of the invention.

DETAILED DESCRIPTION OF THE PREFERRED EMBODIMENTS

The present invention will be concretely described in conjunction with one embodiment.

Figure 1:
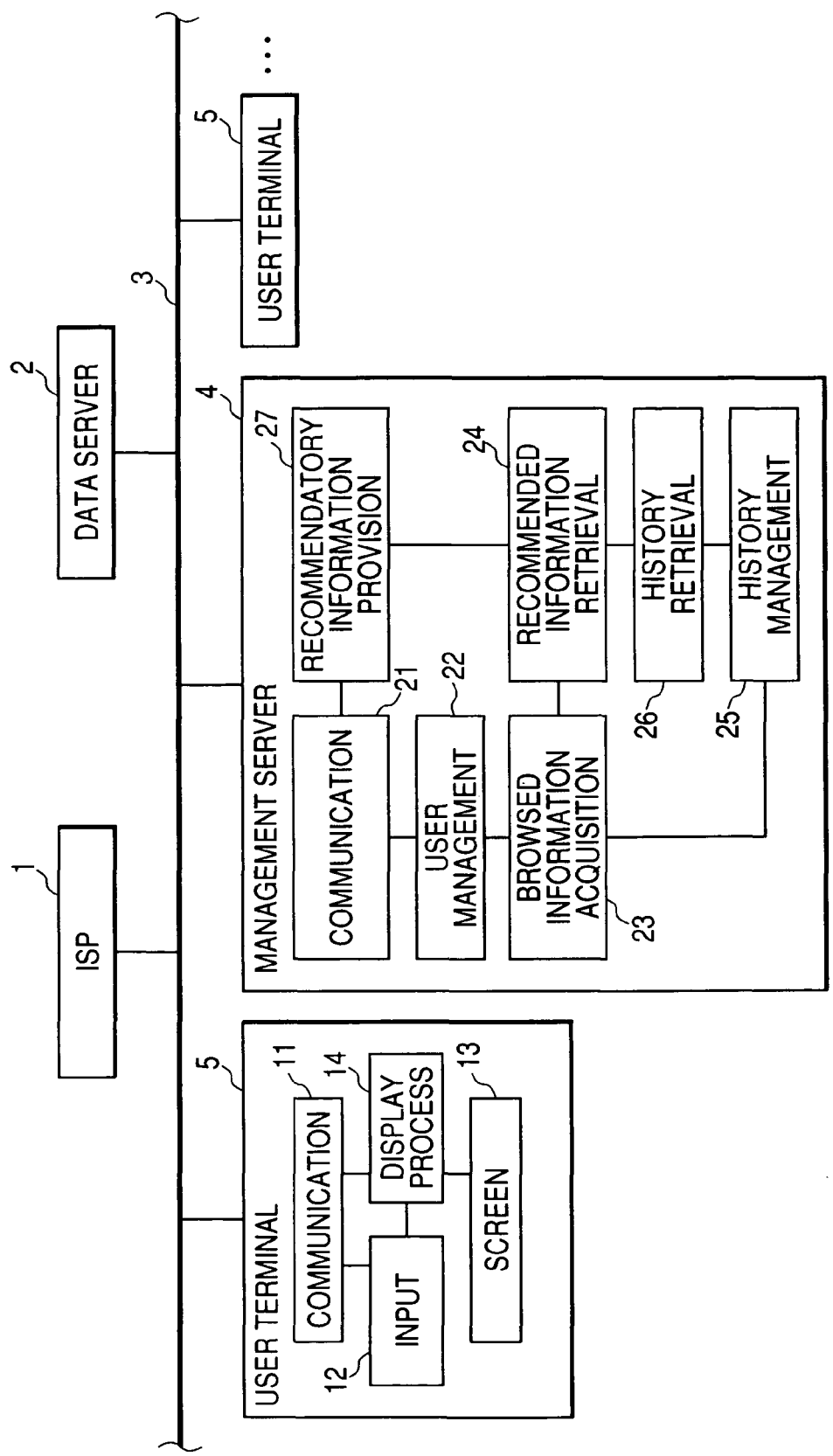
FIG. 1 is a block diagram of a recommendatory information provision system according to an embodiment of the present invention.

Shown in FIG. 1 is a recommendatory information provision system according to an example of the invention. In the recommendatory information provision system of this example, a management apparatus 4 and a plurality of user terminal devices 5 are respectively connected to a network 3 to which an ISP 1 and a data server 2 being document sources are connected.

The user terminal device 5 includes a communication unit 11 for performing network communications, an input unit 12 for accepting a manipulation input from a user, a screen 13 for displaying the information of a document or the like so as to present the information to the user, and a display process unit 14 for executing a process for displaying the information of the document or the like on the screen.

In the system of this example, accordingly, the user gives a browsing instruction accompanied by a document designation, from the input unit 12, whereby the user terminal device 5 acquires the designated document from the network 3 by the Web browser function of the display process unit 14 and displays the acquired document on the screen 13.

By the way, in this example, a service range is specified with the document range of the data server 2 set as the range of a recommendation process based on the management apparatus 4, but various documents on the Internet as have been acquired through the ISP 1 can also be set as a service range by way of example.

The management apparatus 4 receives login information items from the user terminal devices 5, thereby to manage the individual user terminals 5 as subjects for a document recommendation service.

The management apparatus 4 includes a communication unit 21 for performing network communications, an user management unit 22 for acquiring the identification information (name, ID or the like) of the user manipulating the user terminal device 5, simultaneously with the login information or browsed document information from each user terminal device, a browsed information acquisition unit 23 for acquiring through the network 3, the browsed document information (in this example, documental actual data) which is being browsed through the screen display by the user terminal device 5, a recommended information retrieval unit 24 for retrieving any recommended document relevant to the browsed document of the user terminal device 5 being a browsing source, on the basis of the acquired document information, a recommendation history management unit 25 for storing and managing history information which concerns the recommendation of the recommended document, a recommendation history retrieval unit 26 for retrieving the history information of the retrieved recommended document from the recommendation history management unit 25, and a recommendatory information provision unit 27 for providing information concerning the retrieved recommended document (in this example, the name and a URL) and the history information of the recommended document, to the user terminal device 5 being the browsing source through the network 3.

Here, the browsed information acquisition unit 23 acquires the browsed document information which is being browsed by the user terminal device 5, by such a method, for example, that the management apparatus 4 always monitors the communication of the user terminal device 5 for acquiring the browsed document from on the network 3 and receives the browsed document data by itself, or that the management apparatus 4 receives document data being currently browsed, from the user terminal device 5.

Besides, the recommended information retrieval unit 24 in this example executes a process for extracting a feature word from browsed document contents acquired from the user terminal device 5, and for retrieving any document which contains the feature word (or whose feature vector based on the feature word lies within a predetermined similar relation), as a relevant recommended document from within a document set stored in the data server 2 being the range of recommended documents.

Besides, the recommendation history management unit 25 in this example stores therein recommendation history information which contains a recommended document identifier (title or URL) and the information of the existence or nonexistence of access as shown in FIG. 2, each time the process for recommending the relevant document to the user terminal device 5 is executed.

Incidentally, the recommendation history management unit 25 can record and manage the information of the existence/nonexistence of the access and the information of the date and hour of the access as are contained in the recommendation history information, by acquiring the information items in such a way that, as in the above, the management apparatus 4 always monitors the communication of the user terminal device 5 for acquiring the document from on the network 3, or that the management apparatus 4 receives the notification of the access to the recommended document, from the user terminal device 5.

Here, the functional unit of the management apparatus 4 and each user terminal device 5 in this example, according to the invention, are configured in such a way that a computer runs programs according to the invention. The functional unit, however, may well be configured by dedicated circuit functions.

As shown in FIG. 2, the recommendation history information which the recommendation history management unit 25 stores and manages, includes a recommendation history table in which "User ID (user name) for which Recommendation was made", "Information of Date and Hour at which Recommendation or Access was made" and "Title or ID (URL) of Browsed document (Key document) which was Origin of Recommendation" are associated, and a recommended information list table in which "Title or ID (URL) of Recommended document" and "Access flag which indicates whether or not Recommended document was accessed by User terminal device" are associated. The recommendation history table and the recommended information list table are associated by "Recommendation list ID".

In the recommendation history management unit 25, it is recorded as an example of the recommendation history information that, when a user (Yamada) having a user ID "U002" was browsing a document "Document-069" at ten twenty-five on Jan. 19, 2005, three documents "Documents-109, 134 and 167" were recommended, among which the recommended document "Document-134" was accessed and browsed.

In the recommendation history information, accordingly, the information for identifying the user who manipulated the user terminal device, the information of the time at which the document was recommended or accessed, the information for identifying the browsed document from which the recommendation process for the relevant documents originated, the information for identifying the recommended documents, the information of the existence/nonexistence of the access to any of the recommended documents are recorded and managed in association. On the basis of the recommendation history information, the screen display of the recommendation history information in the user terminal device 5 is presented as will be explained later.

Figure 3:
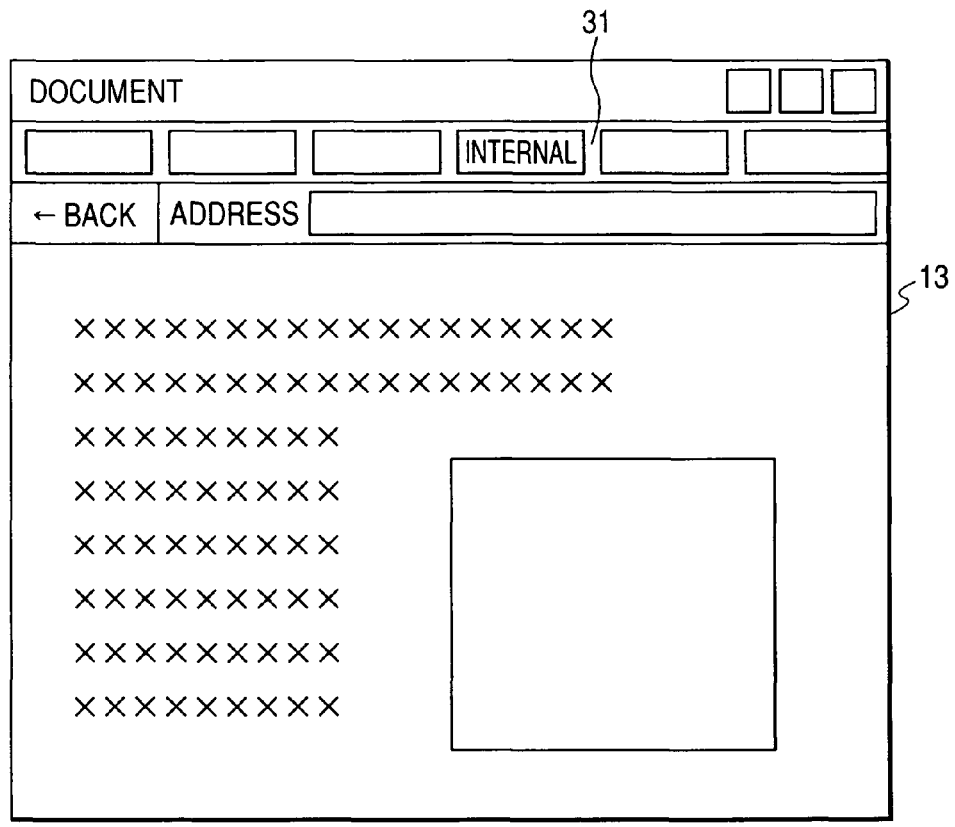
FIG. 3 is a diagram for explaining a screen display example according to an embodiment of the invention.

Shown in FIG. 3 is a state where a browsed document is displayed on the screen 13 of the user terminal device 13. In this example, a tool bar 31 on the screen 13 is click-manipulated, whereby recommended document information and recommendation history information which have been retrieved on the basis of browsed document data and user identification information transmitted to the management apparatus 4 and which have been received from the management apparatus 4 are displayed as a list 32 as shown in FIG. 4.

More specifically, the management apparatus 4 acquires the browsed document data being browsed by the user terminal device 5, it retrieves recommended documents relevant to the browsed document on the basis of the acquired document data from the data server 2, it retrieves the history information of the retrieved recommended documents from the history management unit 25, and it provides the information (titles, URLs or the likes) concerning the retrieved recommended documents, and the history information of the recommended documents to the user terminal device 5 being a browsing source. The user terminal device 5 displays on the screen 13, the information concerning the recommended documents and the history information of the recommended documents as have been provided.

Figure 4:
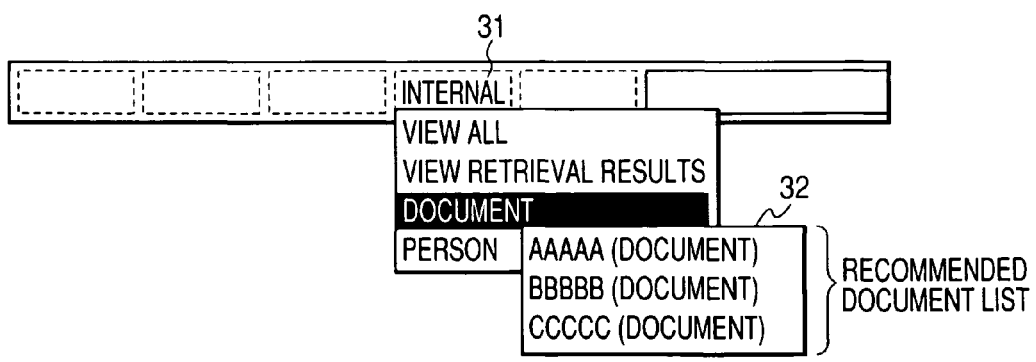
FIG. 4 is a diagram for explaining a screen display example of recommended document information according to an embodiment of the invention.

In the display example shown in FIG. 4, on the basis of the information concerning the recommended documents as has been received from the management apparatus 4, the display process unit 14 displays titles "AAAAA", "BBBBB" and "CCCCC" serving also as the URLs of the recommended documents, in the form of the pull-down list 32 on the screen 13 which is displaying the browsed document.

Figure 5:
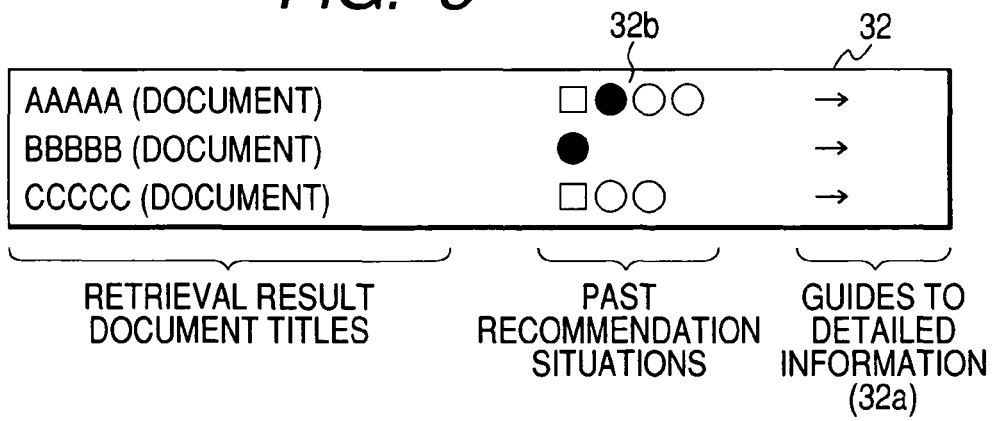
FIG. 5 is a diagram for explaining a screen display example of the recommendation history information according to an embodiment of the invention.
Figure 6:
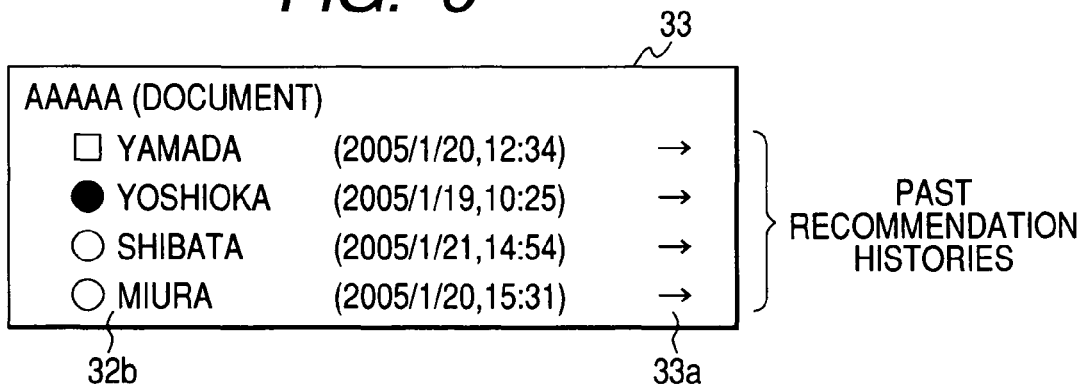
FIG. 6 is a diagram for explaining a screen display example of the recommendation history information according to an embodiment of the invention.
Figure 7:
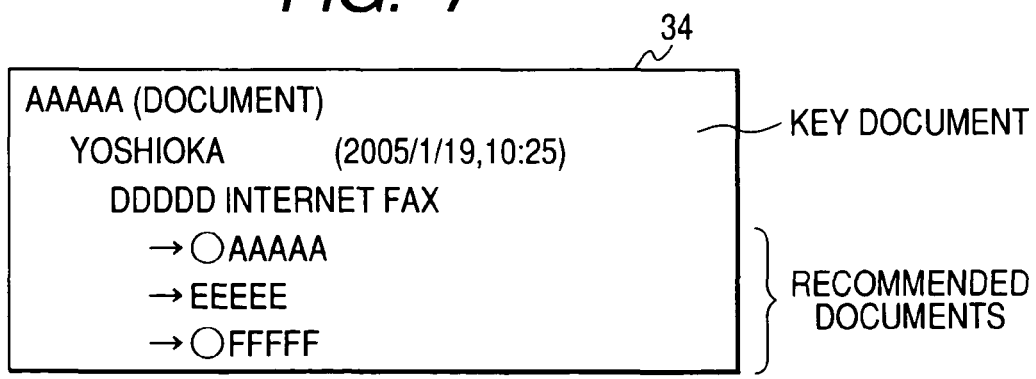
FIG. 7 is a diagram for explaining a screen display example of the recommendation history information according to an embodiment of the invention.

FIGS. 5 through 7 show display examples of history information. In these examples, on the basis of the information concerning the recommended documents and the history information as have been received from the management apparatus 4, the display process unit 14 displays titles serving also as the URLs of recommended documents, and further the history information, in the respective forms of pull-down lists 32, 33 and 34 on the screen 13 which is displaying the browsed document.

In the display example shown in FIG. 5, on the screen 13 displaying the browsed document, the display process unit 14 displays the titles "AAAAA", "BBBBB" and "CCCCC" serving also as the URLs of the recommended documents, in the form of the pull-down list 32 on the basis of the information concerning the recommended documents as has been received from the management apparatus 4, and it displays the past recommendation situations of the respective recommended documents in the pull-down list 32 on the basis of the history information of the recommended documents as has been received from the management apparatus 4.

In this example, the past recommendation situation of each recommended document is displayed by color classification signs 32b corresponding to history contents. By way of example, the square sign (□) denotes that the pertinent document has been recommended to the browsing user himself/herself before, and the round sign (○) denotes that the pertinent document has been recommended to a user other than the browsing user. Besides, the response of the user at the time when the recommendation was made is expressed by the color or pattern of the sign. By way of example, the blackened sign (■ or ●) denotes that, at the recommendation, the user actually accessed the recommended document, and the whitened sign (□ or ○) denotes that the recommended document was merely recommended, and that it was not accessed actually.

Here, one sign may denote a single user, or it may well denote a group or organization which consists of a plurality of users. It is also possible to utilize as the sign, an image expressive of the corresponding user (for example, the photograph of the user's face) or a mark expressive of the group or organization.

Incidentally, the sign display of the history information as stated above is presented in such a way that the recommendatory information provision unit 24 of the management apparatus represents the recommended document history information by the different signs in accordance with the contents of the information and then provides the signs to the user terminal device 5. The sign display, however, may well be presented in such a way that the display process unit 14 of the user terminal device represents the received recommended-document history information by the different signs in accordance with the contents of the information and then displays the signs on the screen.

Further, the pull-down list 32 shown in FIG. 5 is provided with guide buttons 32a for the detailed information of the history information. When the user presses the guide button by a manipulation from the input unit 12, the pull-down list 33 as shown in FIG. 6 is displayed on the screen 13, and the detailed information of the history information concerning the pressed and selected one of the recommended documents is displayed.

In the example shown in FIG. 6, on the basis of the history information of the recommended document as has been received from the management apparatus 4, the display process unit 14 displays the names of users for recommendations, at the times when the selected recommendatory document "AAAAA" was recommended in the past, the information of the dates and hours of the recommendations, and the signs 32b of the utilization situations of the recommendations, in the form of the pull-down list 33. That is, the past recommendation situations indicating the users to whom the recommended document was recommended in the past, together with the times of the recommendations, are presented to the pertinent user, so that the pertinent user can grasp the users who utilized the recommended document in the past.

Further, the pull-down list 33 shown in FIG. 6 is provided with guide buttons 33a for the more detailed information of the history information. When the user presses the guide button by a manipulation from the input unit 12, the pull-down list 34 as shown in FIG. 7 is displayed on the screen 13, and the detailed information of the history information concerning the pressed and selected user for the recommendation, to whom the pressed and selected recommendatory document was recommended, is displayed.

In the example shown in FIG. 7, on the basis of the history information of the recommended document as has been received from the management apparatus 4, the display process unit 14 displays the title "DDDDD" of a key document (browsing source document) in the past recommendation, and the titles "AAAAA", "EEEEE" and "FFFFF" of recommendatory documents recommended on the basis of the key document in the past recommendation, in the form of the pull-down list 34, regarding the user "Yoshioka" in the past recommendation selected as to the selected recommendatory document "AAAAA". That is, the past recommendation situations indicating the key document on the basis of which the recommended documents were presented in the past, together with the documents recommended on that occasion, are presented to the pertinent user, so that the pertinent user can grasp the past key document on the basis of which the recommended documents were presented to the selected user, together with the recommended documents.

Figure 8:
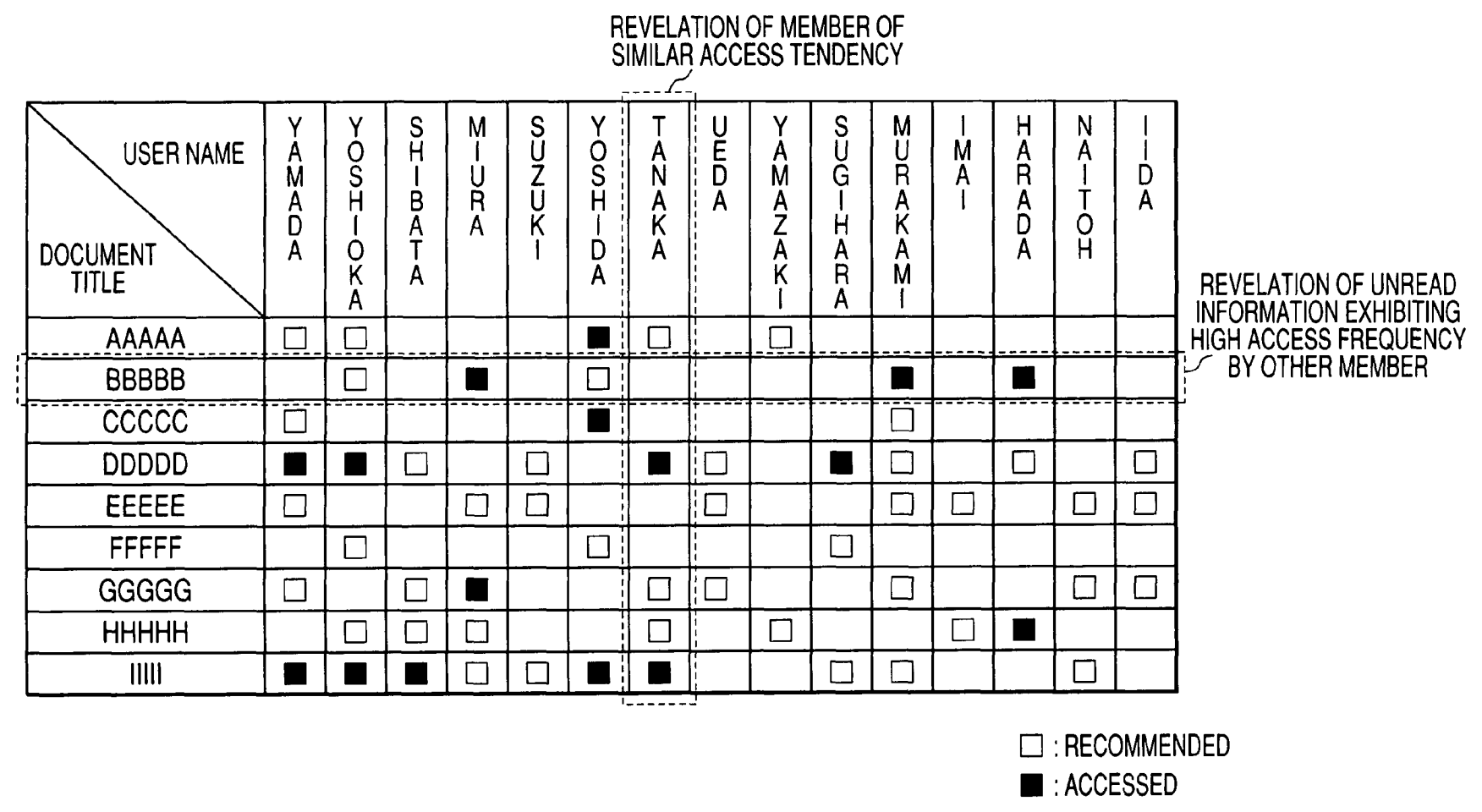

Shown in FIG. 8 is an example of another aspect in which the display process unit 14 of the user terminal device displays the history information items of recommended documents as have been received from the management apparatus 4, on the screen 13.

Incidentally, the recommendatory information provision unit 27 of the management apparatus may well process the history information items into such a display aspect and then provide these information items to the user terminal device 5.

In the history information display example of FIG. 8, the titles of the recommended documents are taken on the axis of ordinates, while the names of users for recommendations are taken on the axis of abscissas. Thus, the documents which were recommended to the respective users, and how the documents were utilized (whether they were merely recommended or were actually accessed), are displayed by sign representations in overlooking fashion.

In this way, the correlations between the documents and the users can be visualized. The visualization permits the user to grasp, for example, the utilization situations and relations of the individual members with respect to the documents shared by the plurality of users, thereby to contribute to the revelation of any other member who utilizes or relates to any document similarly to the user, the revelation of any document of high frequency in use, the revelation of any document seemed to be useful for the user, from among the documents not read yet, and so forth.

Shown in FIG. 9 is an example of another aspect in which the display process unit 14 of the user terminal device displays the history information items of recommended documents as have been received from the management apparatus 4, on the screen 13.

Incidentally, the recommendatory information provision unit 27 of the management apparatus may well process the history information items into such a display aspect and then provide these information items to the user terminal device 5.

In the history information display example of FIG. 9, the titles of the recommended documents are taken on the axis of ordinates, while the number of times of recommendations, the number of times of accesses, the degree of utilization (the number of times of accesses/the number of times of recommendations), the number of persons of the recommendations, the number of persons of the accesses, and the degree of utilization (the number of persons of the accesses/the number of persons of the recommendations) are taken on the axis of abscissas. Thus, the display permits the user to grasp at a look, how many times each document was recommended to the users, and how many times it was utilized.

In this way, the display can contribute to information for judging the extents to which the individual documents shared as a document set by the plurality of users are useful.

Here, the acquisition of the document which the user terminal device 5 is browsing may be relied on, for example, a method in which documental electronic data are acquired by acquiring Web page data, or a method in which document data are acquired by scanning a book that is printed with the document being browsed by the user terminal device 5.

Besides, the display aspect of the recommended documents may well be a display aspect which reflects the frequency of recommendations, the degree of relevance, or the like, in such a way that the documents recommended oftener in the past are displayed at higher ranks, or that the documents of higher relevances to the browsed document are displayed at higher ranks.

Besides, regarding the display aspect of the recommended documents and the recommendation histories, any of various aspects such as a graphical format can be adopted apart from the tabular format aspects shown in FIGS. 8 and 9, and the recommended documents and their histories may well be notified to the specified address of the user by electronic mail.

Also, regarding the recommended documents and the recommendation histories, disclosure limitations complying with user instructions may well be imposed on the history information of the history management unit 25 so that each user can regulate the disclosure of his/her own recommendation histories to the others or can limit the range of the disclosure.

Further, regarding the recommended documents and the recommendation histories, a period of time or disclosure limitations concerning the users may well be imposed on the history information of the history management unit 25 so as to handle only the histories within the predetermined period of time or to handle only the histories concerning the specified users (for example, the users who belong to an identical group).

What is claimed is:

1. A recommendatory information provision system comprising:
    a management apparatus; and
    a user terminal device, wherein:
        the management apparatus provides information concerning any recommended document relevant to a browsed document which is being browsed by the user terminal device to the user terminal device;

the management apparatus includes:
- a browsed information acquisition unit that acquires information of the browsed document which is being browsed by the user terminal device;
- a recommended document retrieval unit that retrieves the recommended document relevant to the browsed document which is being browsed by the user terminal device, based on the acquired document information;
- a recommendation history management unit that stores and manages history information of recommendation, which was made by the recommended document retrieval unit in the past, of the recommended document;
- a recommendation history retrieval unit that retrieves from the recommendation history management unit, the history information of the recommendation, which was made by the recommended document retrieval unit in the past, of the recommended document which is retrieved by the recommended document retrieval unit; and
- a controller that is configured to allow each user to set a disclosure range corresponding to the history information that is disclosed to other users;
- a recommendatory information provision unit that provides to the user terminal device, the information concerning the recommended document and the history information of the recommendation of the recommended document, which is retrieved by the recommended document retrieval unit; and
- the user terminal device includes a display process unit that displays on a screen, the information concerning the recommended document and the history information of the recommendation of the recommended document which are provided from the management apparatus;
- the history information of the recommendation of the recommended document being history of (i) data indicating whether the recommended document was accessed; (ii) data indicating whether the recommended data was only recommended and not accessed; (iii) whether the user terminal device or another user terminal device has accessed the recommended document; and
- wherein the screen shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

2. The recommendatory information provision system according to claim 1, wherein:
- the management apparatus includes a user management unit that acquires from the user terminal device, identification information of a user who manipulates the user terminal device;
- the recommendation history management unit stores and manages identification information of a user to whom the recommended document was recommended in the past, as the history information of the recommendation of the recommended document; and
- the recommendatory information provision unit provides to the user terminal device, the history information of the recommendation of the recommended document which contains the user identification information.

3. The recommendatory information provision system according to claim 1, wherein:
- the recommendation history management unit stores and manages information of a time at which the recommended document was recommended, as the history information of the recommendation of the recommended document; and
- the recommendatory information provision unit provides to the user terminal device, the history information of the recommendation of the recommended document which contains the recommendation time information.

4. The recommendatory information provision system according to claim 1, wherein:
- the browsed information acquisition unit acquires information on access to the provided recommended document by the user terminal device;
- the recommendation history management unit stores and manages history of existence or nonexistence of the access to the recommended document, as the history information of the recommendation of the recommended document; and
- the recommendatory information provision unit provides to the user terminal device, the history information of the recommendation of the recommended document which contains the access history information.

5. The recommendatory information provision system according to claim 4, wherein:
- the recommendation history management unit stores and manages information of a time of the access to the recommended document, as the history information of the recommendation of the recommended document; and
- the recommendatory information provision unit provides to the user terminal device, the history information of the recommendation of the recommended document which contains the access time information.

6. The recommendatory information provision system according to claim 1, wherein:
- the recommendation history management unit stores and manages information concerning a past browsed document from which the retrieval of the recommended document originated, as the history information of the recommendation of the recommended document; and
- the recommendatory information provision unit provides to the user terminal device, the history information of the recommendation of the recommended document which contains the information concerning the browsed document of the recommendation origin.

7. The recommendatory information provision system according to claim 6, wherein:
- the recommendation history management unit stores and manages information concerning a recommended document which was recommended in the past based on the browsed document which is a recommendation origin, as the history information of the recommendation of the recommended document; and
- the recommendatory information provision unit provides to the user terminal device, the history information of the recommendation of the recommended document which contains the information concerning other recommended documents which were recommended in the past based on the browsed document of the recommendation origin.

8. The recommendatory information provision system according to claim 1, wherein:
- the recommendatory information provision unit provides to the user terminal device at least one of plural signs, which are different from each other, as the history information of the recommendation of the recommended document in accordance with contents of the history information of the recommendation of the recommended document.

9. A recommendatory management apparatus which provides information concerning any other documents relevant to a browsed document which is being browsed by the user terminal device to a user terminal device, comprising:
a browsed information acquisition unit that acquires information of the browsed document which is being browsed by the user terminal device;
a recommended document retrieval unit that retrieves the recommended document relevant to the browsed document which is being browsed by the user terminal device, based on the acquired document information;
a recommendation history management unit that stores and manages history information of recommendation, which was made by the recommended document retrieval unit in the past, of the recommended document;
a recommendation history retrieval unit that retrieves from the recommendation history management unit, the history information of the recommendation, which was made by the recommended document retrieval unit in the past, of the recommended document which is retrieved by the recommended document retrieval unit; and
a controller that is configured to allow each user to set a disclosure range corresponding to the history information that is disclosed to other users;
wherein the history information of the recommendation of the recommended document being history of (i) data indicating whether the recommended document was accessed; (ii) data indicating whether the recommended data was only recommended and not accessed; (iii) whether the user terminal device or another user terminal device has accessed the recommended document; and
a screen for the user terminal device that shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

10. A non-transitory computer readable medium storing a program that causes a computer to execute a process for providing information concerning any other document relevant to a browsed document being browsed by a user terminal device to the user terminal device, comprising:
acquiring information of the browsed document which is being browsed by the user terminal device;
retrieving the recommended document relevant to the browsed document which is being browsed by the user terminal device, based on the acquired document information;
storing and managing history information of recommendation, which was retrieved by the retrieving the recommended document in the past, of the recommended document;
allowing each user to set a disclosure range corresponding to the history information that is disclosed to other users;
retrieving the history information of the recommendation, which was retrieved by the retrieving the recommended document in the past, of the recommended document which is retrieved; and
providing to the user terminal device the information concerning the recommended document and the history information of the recommendation of the recommended document, which is retrieved by the retrieving the recommended document;
wherein the history information of the recommendation of the recommended document being history of (i) data indicating whether the recommended document was accessed; (ii) data indicating whether the recommended data was only recommended and not accessed; (iii) whether the user terminal device or another user terminal device has accessed the recommended document; and
a screen for the user terminal device that shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

11. A user terminal device which constitutes a recommendatory information provision system, conjointly with a management apparatus which has a browsed information acquisition unit that acquires information of a browsed document that is being browsed by the user terminal device, a recommended document retrieval unit that retrieves any recommended document relevant to the browsed document which is being browsed by the user terminal device based on the acquired document information, a recommendation history management unit that stores and manages history information of recommendation, which was made by the recommended document retrieval unit in the past, of the recommended document, a recommendation history retrieval unit that retrieves from the recommendation history management unit, the history information of the recommendation, which was made by the recommended document retrieval unit in the past, of the recommended document retrieved by the recommended document retrieval unit, and a recommendatory information provision unit that provides to the user terminal device information concerning the retrieved recommendatory document and the history information of the recommendation of the recommended document, which is retrieved by the recommended document retrieval unit, the user terminal device comprising:
a controller that is configured to allow each user to set a disclosure range corresponding to the history information that is disclosed to other users;
a display process unit that displays on a screen the information concerning the recommended document and the history information of the recommendation of the recommended document which are provided from the management apparatus;
wherein the history information of the recommendation of the recommended document is history of (i) data indicating whether the recommended document was accessed; (ii) data indicating whether the recommended data was only recommended and not accessed; and (iii)

whether the user terminal device or another user terminal device has accessed the recommended document; and wherein the screen shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

12. A recommendatory information provision method wherein a management apparatus provides information concerning any recommended document relevant to a browsed document that is being browsed by a user terminal device to the user terminal device, the method comprising:

acquiring information of the browsed document being browsed by the user terminal device from the management apparatus, retrieving the recommended document relevant to the browsed document which is being browsed by the user terminal device based on the acquired document information, retrieving history information concerning recommendation of the recommended document from a recommendation history management unit for storing and managing the history information of the recommendation, which was retrieved by the retrieving history information in the past, and providing information concerning the retrieved recommendatory document and the history information of the recommendation, which was retrieved by the retrieving history information in the past, of the recommended document to the user terminal device by the management apparatus; and allowing each user to set a disclosure range corresponding to the history information that is disclosed to other users;

displaying on a screen the information concerning the recommended document and the history information of the recommendation of the recommended document, which are provided from the management apparatus, by the user terminal device;

wherein the history information of the recommendation of the recommended document is history of (i) data indicating whether the recommended document was accessed; (ii) data indicating whether the recommended data was only recommended and not accessed; and (iii) whether the user terminal device or another user terminal device has accessed the recommended document; and wherein the screen shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

13. The recommendatory information provision system of claim 1, wherein the history information of the recommendation of the recommended document includes information indicating that the recommended document was accessed when the recommended document was recommended.

14. The recommendatory information management apparatus of claim 9, wherein the history information of the recommendation of the recommended document includes information indicating that the recommended document was accessed when the recommended document was recommended.

15. The computer readable medium of claim 10, wherein the history information of the recommendation of the recommended document includes information indicating that the recommended document was accessed when the recommended document was recommended.

16. The user terminal device of claim 11, wherein the history information of the recommendation of the recommended document includes information indicating that the recommended document was accessed when the recommended document was recommended.

17. The recommendatory information provision method of claim 12, wherein the history information of the recommendation of the recommended document includes information indicating that the recommended document was accessed when the recommended document was recommended.

18. A recommendatory information provision system comprising:

a management apparatus; and a user terminal device, wherein:

the management apparatus provides information concerning any recommended document relevant to a browsed document which is being browsed by the user terminal device to the user terminal device;

the management apparatus includes:

a browsed information acquisition unit that acquires information of the browsed document which is being browsed by the user terminal device;

a recommended document retrieval unit that retrieves the recommended document relevant to the browsed document which is being browsed by the user terminal device, based on the acquired document information;

a recommendation history management unit that stores and manages history information of recommendation, which was made by the recommended document retrieval unit in the past, of the recommended document, wherein the history information concerning the recommended document includes information of a time at which the recommended document was recommended;

a recommendation history retrieval unit that retrieves from the recommendation history management unit the history information of the recommendation, which was made by the recommended document retrieval unit in the past, of the recommended document which is retrieved by the recommended document retrieval unit; and a controller that is configured to allow each user to set a disclosure range corresponding to the history information that is disclosed to other users;

a recommendatory information provision unit that provides to the user terminal device the information concerning the recommended document and the history information of the recommendation of the recommended document, which is retrieved by the recommended document retrieval unit, wherein the history information of the recommendation of the recommended document is history of (i) data indicating whether the recommended document was accessed; (ii) data indicating whether the recommended data was only recommended and not accessed; and (iii) whether the user terminal device or another user terminal device has accessed the recommended document;

the user terminal device includes a display process unit that displays on a screen the information concerning the recommended document and the history information of the recommendation of the recommended document, which are provided from the management apparatus; and wherein the displaying further comprises showing a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

19. A recommendatory information provision method wherein a management apparatus provides information concerning any recommended document relevant to a browsed document that is being browsed by a user terminal device to the user terminal device, the method comprising:

acquiring information of the browsed document being browsed by the user terminal device from the management apparatus, retrieving the recommended document relevant to the browsed document which is being browsed by the user terminal device based on the acquired document information;

retrieving history information concerning recommendation of the recommended document from a recommendation history management unit for storing and managing the history information of the recommendation, which was retrieved by the retrieving history information in the past, wherein the history information concerning the recommended document includes information of a time at which the recommended document was recommended, and providing information concerning the retrieved recommendatory document and the history information of the recommendation, which was retrieved by the retrieving history information in the past, of the recommended document to the user terminal device by the management apparatus; and a controller that is configured to allow each user to set a disclosure range corresponding to the history information that is disclosed to other users;

displaying on a screen, the information concerning the recommended document and the history information of the recommendation of the recommended document which are provided from the management apparatus, by the user terminal device, wherein the history information of the recommendation of the recommended document is history of (i) data indicating whether the recommended document was accessed; (ii) data indicating whether the recommended data was only recommended and not accessed; and (iii) whether the user terminal device or another user terminal device has accessed the recommended document; and wherein the displaying further comprises showing a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

20. A recommendatory information provision system comprising:

a management apparatus; and
a user terminal device, wherein:
the management apparatus provides information concerning any recommended document relevant to a browsed document which is being browsed by the user terminal device to the user terminal device;

the management apparatus includes:
a browsed information acquisition unit that acquires information of the browsed document which is being browsed by the user terminal device;

a recommended document retrieval unit that retrieves the recommended document relevant to the browsed document which is being browsed by the user terminal device, based on the acquired document information;

a recommendation history management unit that stores and manages history information of recommendation, which was made by the recommended document retrieval unit in the past, of the recommended document, wherein the history information concerning the recommended document includes information concerning a past browsed document from which the retrieval of the recommended document originated;

a recommendation history retrieval unit that retrieves from the recommendation history management unit the history information of the recommendation, which was made by the recommended document retrieval unit in the past, of the recommended document which is retrieved by the recommended document retrieval unit; and a controller that is configured to allow each user to set a disclosure range corresponding to the history information that is disclosed to other users;

a recommendatory information provision unit that provides to the user terminal device the information concerning the recommended document and the history information of the recommendation of the recommended document, which is retrieved by the recommended document retrieval, wherein the history information of the recommendation of the recommended document is history of (i) data indicating whether the recommended document was accessed; (ii) data indicating whether the recommended data was only recommended and not accessed; and (iii) whether the user terminal device or another user terminal device has accessed the recommended document; and a display process unit, included by the user terminal device, that displays on a screen, the information concerning the recommended document and the history information of the recommendation of the recommended document, which are provided from the management apparatus; and wherein the screen shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

21. A recommendatory information provision method wherein a management apparatus provides information concerning any recommended document relevant to a browsed document that is being browsed by a user terminal device to the user terminal device, the method comprising:
   acquiring information of the browsed document being browsed by the user terminal device from the management apparatus, retrieving the recommended document relevant to the browsed document which is being browsed by the user terminal device based on the acquired document information;
   retrieving history information concerning recommendation of the recommended document from a recommendation history management unit for storing and managing the history information of the recommendation, which was retrieved by the retrieving history information in the past, wherein the history information concerning the recommended document includes information concerning a past browsed document from which the retrieval of the recommended document originated, and providing information concerning the retrieved recommendatory document and the history information of the recommendation, which was retrieved by the retrieving history information in the past, of the recommended document to the user terminal device by the management apparatus; and
   allowing each user to set a disclosure range corresponding to the history information that is disclosed to other users;
   displaying on a screen the information concerning the recommended document and the history information of the recommendation of the recommended document which are provided from the management apparatus, by the user terminal device;
   wherein the history information of the recommendation of the recommended document is history of (i) data indicating whether the recommended document was accessed and (ii) data indicating whether the recommended data was only recommended and not accessed; and (iii) whether the user terminal device or another user terminal device has accessed the recommended document; and
   wherein the displaying further comprises showing a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

22. The recommendatory information provision system according to claim 1,
   wherein the screen shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

23. The recommendatory information management apparatus of claim 9, further comprising:
   a screen for the user terminal device that shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

24. The computer readable medium of claim 10, further comprising:
   a screen for the user terminal device that shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

25. The user terminal device of claim 11,
   wherein the screen shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

26. The recommendatory information provision method of claim 12,
   wherein the screen shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

27. A recommendatory information provision system according to claim 18,
   wherein the displaying further comprises showing a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

28. A recommendatory information provision method according to claim 19,
wherein the displaying further comprises showing a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

29. A recommendatory information provision system according to claim 20,
wherein the screen shows a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

30. A recommendatory information provision method according to claim 21,
wherein the displaying further comprises showing a table with the documents on one axis and the users on another axis, with grids that correspond to each user and document containing (i) a blank indicating that the corresponding document has not been recommended to or accessed by the corresponding user or (ii) a symbol which is selected from the group comprising a first symbol indicating the corresponding document has been recommended to and accessed by the corresponding user and a second symbol indicating the corresponding document has been recommended to but not accessed by the corresponding user.

* * * * *